United States Patent [19]
Haslam et al.

[11] 3,794,378
[45] Feb. 26, 1974

[54] SEAT ASSEMBLY

[75] Inventors: Harry Haslam, Detroit; Giulio Massetti; Herbert W. Truesdale, both of Dearborn Heights, all of Mich.

[73] Assignee: Ford Motor Company, Dearborn, Mich.

[22] Filed: Nov. 24, 1972

[21] Appl. No.: 309,573

[52] U.S. Cl. ............................................. 297/219
[51] Int. Cl. ............................................ A47c 27/00
[58] Field of Search ..... 297/218, 219, 226; 5/353.1, 5/353.5, 353.6; 160/391, 392, 394

[56] References Cited
UNITED STATES PATENTS

| | | | |
|---|---|---|---|
| 3,632,164 | 1/1972 | Radke | 297/219 |
| 588,244 | 8/1897 | Roberts | 160/392 |
| 3,630,572 | 12/1971 | Homier | 297/219 X |

FOREIGN PATENTS OR APPLICATIONS

| | | | |
|---|---|---|---|
| 1,037,236 | 7/1966 | Great Britain | 160/392 |

*Primary Examiner*—James C. Mitchell
*Attorney, Agent, or Firm*—John J. Roethal; Keith L. Zerschling

[57] ABSTRACT

A seat assembly in which the improvement comprises an elastomeric cushion having at least one elongated groove of sustantial depth extending across its surface. An elongated anchor means is moulded into the cushion contiguous to the bottom of the groove and is adapted to receive in retention engagement a retention member secured to a cushion cover, thereby securely retaining the cover over the cushion.

5 Claims, 2 Drawing Figures

PATENTED FEB 26 1974 3,794,378

3,794,378

SEAT ASSEMBLY

BACKGROUND OF THE INVENTION

As noted in U.S. Pat. No. 3,632,164 issued on Jan. 4, 1972 to Arthur O. Radke for "Vehicle Seat Having an Improved Seat Cover Attachment System," one method of attaching a seat cover fabric to an elastomeric (foam) cushion involves embedding a wire, usually shaped to follow the seat contour, below the surface of the cushion. The wire is attached to the seat cover by the use of hog rings, wire loops, rope tiedowns or the equivalent fastening means. The hog rings or the like pierce a listing or flap sewn to the underside of the seat cover.

As shown in U.S. Pat. No. 3,630,572, issued to Robert I. Homier on Dec. 28, 1971 for "Seat Assembly," the embedded wire must be anchored to the seat frame since it could cut through the foam cushion as the cushion flexes under use.

The Radke patent discloses the use of isolated anchor means embedded in the cushion below its seating surface. A seat cover is positioned in contact with the cushion and fastening means, preferably hog rings, link the seat cover to each of the anchor means, thereby firmly attaching the seat cover to the cushion. The isolated anchor means eliminate the requirement of an embedded wire.

It is an object of the present invention to provide anchor means embedded in the cushion adapted to directly coact with a retention member to securely retain the cover fabric on the cushion, thereby going a step further and eliminating the hog ring method of tiedown listing attachment.

SUMMARY OF THE INVENTION

The present invention relates to an improvement in a seat assembly. An elastomeric or foam cushion has at least one elongated groove of substantial depth extending across its surface. An elongated anchor means is moulded into the cushion contiguous to the bottom of the groove. A cushion cover of any suitable fabric is provided for covering the cushion. Secured to the fabric is an elongated resilient retention member. The retention member is inserted into the groove and has retention means thereon in engagement with the anchor means thereby to hold the cover fabric in place on the cushion.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
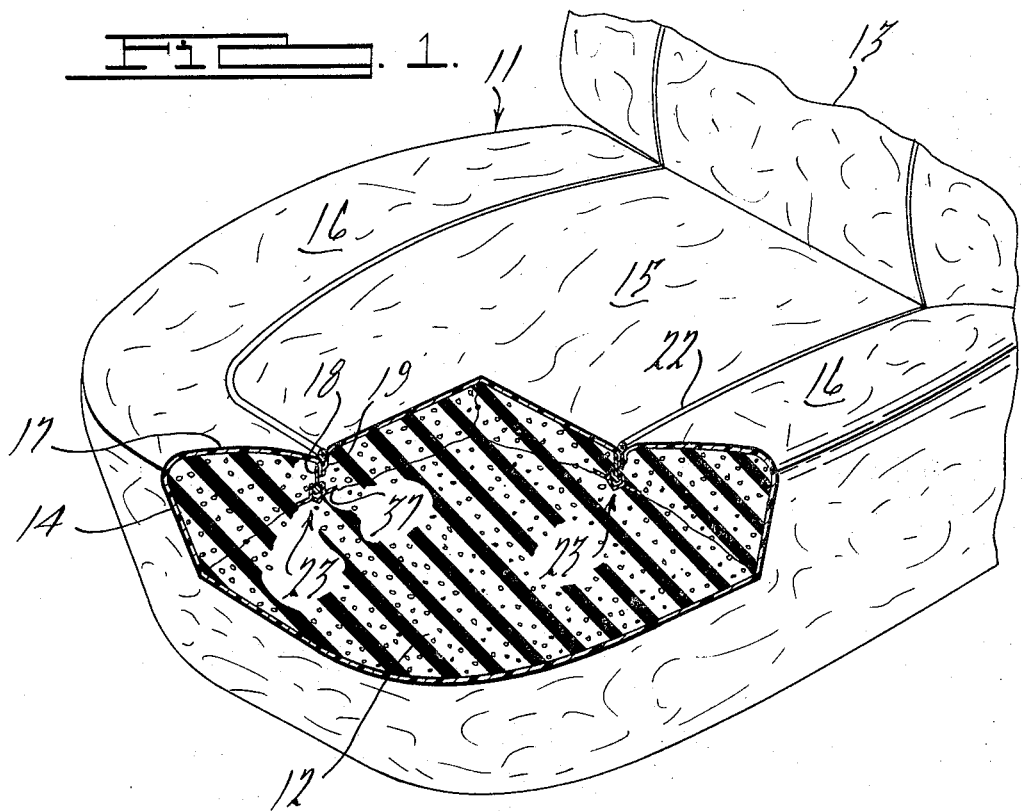
FIG. 1 is a perspective view in partial section of a seat assembly embodying the present invention.

Referring now to the drawing, there is shown a part of a seat assembly, generally designated 11, commonly known as a vehicle bucket seat. The seat assembly 11 comprises contoured seat and backrest cushions 12 and 13, respectively, that are covered with cushion covering fabric 14.

A typical bucket seat cushion 12 is contoured generally into a depressed central seating portion 15, side bolster portions 16 and a front bolster portion 17. Because of the contour of the upper surface of the cushion 12, it becomes somewhat difficult to stretch the covering fabric 14 taut while at the same time holding to the surface contour.

The seat cushion 12 is moulded with an elongated groove 18 following the intersection of the adjacent edges of the central seating portion 15 and the bolster portions 16 and 17. On a line correlated with the position of the groove 18 the covering fabric is provided with a composite flap 19. That is, the two pieces of fabric 14a and 14b are overlapped and stitched together at 21 to provide the depending flap 19. For decorative purposes, a welt 22 is stitched in between the overlapped fabric portions forming the composite flap 19.

Figure 2:
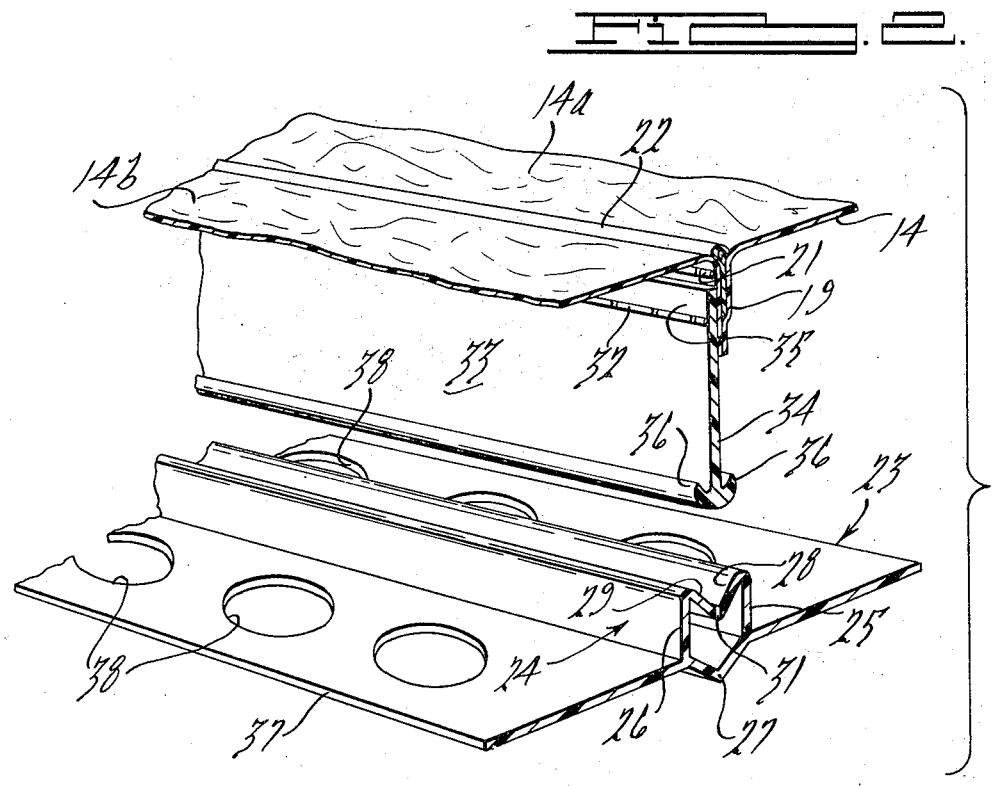
FIG. 2 is an enlarged fragmentary perspective view of the interengageable device for holding the cushion cover in place on the cushion.

In accordance with the present invention, the covering fabric 14 is anchored to the seat cushion without the use of hog rings, tie downs, wire hooks or the like. As best seen in FIG. 2, an anchor means, generally designated 23, is utilized. The anchor means 23 comprises an elongated member extruded or otherwise formed of a resilient plastic. The anchor means 23 comprises a box section 24 having vertical side walls 25 and 26 closed at the bottom by a V-shaped wall 27 to provide structural rigidity. The top wall comprises two inwardly declining walls or retention lips 28 and 29 which terminate with a gap 31 between their adjacent edges.

Secured to the fabric flap 19 as by stitching 32 is a retention member 33. This retention member 33 is a strip of resilient material, preferably a plastic, having retention means on the edge 34 opposite the edge 35 which is stitched to the fabric flap 19. The lower edge 34 terminates in laterally extending projections 36 adapted to be forced between the retention lips 28 and 29 on the anchor means 23. In assembled relation, the projections resist withdrawal of the retention member from the anchor means 23 and thereby from the groove 18.

The anchor means 23 is held in the cushion 12 by enlarged laterally extending flanges 37 having a plurality of apertures 38. It will be understood that the anchor means 23 are prepositioned in the mold in which the cushion 12 is formed by a foam molding process. The material will flow through the apertures 38 locking the anchor means 23 within the cushion 12.

The assembly of the cushion covering 14 can be done very simply and rapidly. It is necessary only to align the retention member 33 with the groove 18 and to press the retention member 33 downwardly into the groove 18 with sufficient force to cause the projections 36 to separate the retention lips 28–29. When the retention member projections 36 pass through the lips 28–29, they will be held against withdrawal. It will be understood that the cushion 12 will be compressed as the retention member 33 is formed into engagement with the anchor means 23. Upon release of the pressure, the spring-back of the cushion will cause the cushion cover to assume a taut fit over the cushion.

It is to be understood that the invention is not limited to the exact construction illustrated and described above, but that various changes and modifications may be made without departing from the spirit and scope of the invention as defined by the following claims:

We claim:

1. In a seat assembly, an elastomeric cushion having at least one elongated groove of substantial depth extending across its surface, an elongated anchor means moulded into the cushion contiguous to the bottom of the groove, a cushion cover comprising a fabric for covering the surface of the cushion, and an elongated resilient retention member secured to the fabric and inserted within the groove, the retention member having integral retention means in interlocking engagement with the anchor means to hold the cover fabric in place on the cushion.

2. In a seat assembly according to claim 1, in which:

the anchor means comprises a longitudinally extending clip means having resilient opposed retention lips spaced above the bottom of the groove, and the retention means on the retention members are interlocked with the retention lips.

3. In a seat assembly according to claim 2, in which:

the retention member is a strip of resilient material secured along one of its longitudinal edges to the fabric to project in a direction normal to the latter when covering the cushion.

4. In a seat assembly according to claim 3, in which:

the retention means on the retention member comprise laterally extending projections along the strip edge spaced from the one longitudinal edge, the projections being insertable between the retention lips of the clip means for retention of the strip against withdrawal from the groove.

5. In a seat assembly according to claim 4, in which:

the clip means has laterally extending flanges embedded in the elastomeric cushion to anchor the anchor means against movement in a direction normal to the surface of the cushion.

* * * * *

Disclaimer 3,794,378.—*Harry Haslam*, Detroit, and *Giulio Massetti* and *Herbert W. Truesdale*, Dearborn Heights, Mich. SEAT ASSEMBLY. Patent dated Feb. 26, 1974. Disclaimer filed June 17, 1974, by the assignee, *Ford Motor Company*.

Hereby enters this disclaimer to claims 1 to 5, inclusive, of said patent.

[*Official Gazette July 8, 1975.*]